(12) United States Patent
Naskali et al.

(10) Patent No.: US 9,287,427 B2
(45) Date of Patent: Mar. 15, 2016

(54) SOLAR CELL ARRANGEMENT HAVING AN INDUCTION LOOP ARRANGEMENT

(75) Inventors: Matti Juhani Naskali, Tokyo (JP); Petri Vuori, Salo (FI); Lea Myyrylainen, Espoo (FI); Cristina Dobrin, San Deigo, CA (US)

(73) Assignee: Nokia Technologies Oy, Espoo (FI)

( * ) Notice: Subject to any disclaimer, the term of this patent is extended or adjusted under 35 U.S.C. 154(b) by 326 days.

(21) Appl. No.: 13/643,881

(22) PCT Filed: Apr. 28, 2010

(86) PCT No.: PCT/EP2010/055735
§ 371 (c)(1),
(2), (4) Date: Jan. 2, 2013

(87) PCT Pub. No.: WO2011/134509
PCT Pub. Date: Nov. 3, 2011

(65) Prior Publication Data
US 2013/0098430 A1    Apr. 25, 2013

(51) Int. Cl.
*H02J 7/00*        (2006.01)
*H01L 31/04*    (2014.01)
(Continued)

(52) U.S. Cl.
CPC ............... *H01L 31/04* (2013.01); *H02J 7/0068* (2013.01); *H02S 10/40* (2014.12); *H02J 7/025* (2013.01); *H02J 7/35* (2013.01); *Y02E 10/50* (2013.01)

(58) Field of Classification Search
USPC ........................................................ 320/101
See application file for complete search history.

(56) References Cited

U.S. PATENT DOCUMENTS

| 4,798,660 A | 1/1989 | Ermer et al. |
| 5,644,207 A * | 7/1997 | Lew et al. ..................... 320/101 |

(Continued)

FOREIGN PATENT DOCUMENTS

| DE | 4233283 | 4/1994 |
| DE | 4311385 | 10/1994 |

(Continued)

OTHER PUBLICATIONS

International Search Report for International Application No. PCT/EP2010/055735—Date of Completion of Search: Mar. 29, 2011, 5 pages.

(Continued)

*Primary Examiner* — Yalkew Fantu
(74) *Attorney, Agent, or Firm* — Locke Lord LLP

(57) ABSTRACT

Apparatus comprises a solar cell arrangement comprising one or more solar cells arranged in a planar structure, the solar cell arrangement having a front surface and a rear surface, the solar cell arrangement being operable to produce electrical power in response to the incidence of light on the front surface. It includes an induction loop arrangement comprising one or more induction loops arranged in a planar structure. The induction loop arrangement is configured to produce electrical power in response to the presence of an electric or electromagnetic field extending through the plane of the induction loop arrangement, and/or is configured to generate an radiate electric or electromagnetic field through the plane of induction loop arrangement in response to being energized with alternating current electrical power. Each solar cell in the arrangement is partly or substantially transparent to electromagnetic fields, and the induction loop arrangement is supported in juxtaposition with the rear surface of the solar cell.

11 Claims, 3 Drawing Sheets

(51) Int. Cl.
  *H02S 10/40* (2014.01)
  *H02J 7/02* (2006.01)
  *H02J 7/35* (2006.01)

(56) References Cited

U.S. PATENT DOCUMENTS

| | | | |
|---|---|---|---|
| 6,027,225 A | | 2/2000 | Martin et al. |
| 6,081,104 A | * | 6/2000 | Kern .............................. 323/268 |
| 7,057,102 B2 | * | 6/2006 | Nagasawa ..................... 136/251 |
| 2004/0211459 A1 | * | 10/2004 | Suenaga et al. ............... 136/244 |
| 2009/0128086 A1 | | 5/2009 | Lee |

FOREIGN PATENT DOCUMENTS

| | | |
|---|---|---|
| DE | 19807227 | 9/1999 |
| DE | 19954259 | 5/2001 |
| JP | 10242443 | 9/1998 |
| JP | 2010-081711 | 4/2010 |
| WO | WO9739491 | 10/1997 |

OTHER PUBLICATIONS

Written Opinion of the International Searching Authority for International Application No. PCT/EP2010/055735—Date of Completion of Opinion: Mar. 29, 2011, 7 pages.

* cited by examiner

SOLAR CELL ARRANGEMENT HAVING AN INDUCTION LOOP ARRANGEMENT

FIELD

This invention relates to producing electrical power. In particular, the invention relates to apparatus comprising a solar cell arrangement.

BACKGROUND

It is known to provide a portable device, such as a mobile telephone, with an integrated solar cell arrangement for powering the device using solar energy. It is known in some such devices also to charge a battery of the device using solar power.

SUMMARY

A first aspect of the invention provides apparatus comprising:
  a solar cell arrangement comprising one or more solar cells arranged in a planar structure, the solar cell arrangement having a front surface and a rear surface, the solar cell arrangement being operable to produce electrical power in response to the incidence of light on the front surface and
  an induction loop arrangement comprising one or more induction loops arranged in a planar structure, the induction loop arrangement being at least one of:
  a) configured to produce electrical power in response to the presence of a magnetic field extending through the plane of the induction loop arrangement, and
  b) configured to generate a magnetic field through the plane of the induction loop arrangement in response to being energised with alternating current electrical power,
wherein each solar cell in the arrangement is substantially transparent to magnetic fields, and wherein the induction loop arrangement is supported in juxtaposition with the rear surface of the solar cell.

A second aspect of the invention provides, apparatus comprising:
  solar generating means comprising one or more solar cells arranged in a planar structure, the solar generating means having a front surface and a rear surface, the solar generating means being operable to produce electrical power in response to the incidence of light on the front surface; and
  induction loop means comprising one or more induction loops arranged in a planar structure, the induction loop means being at least one of:
  a) configured to produce electrical power in response to the presence of a magnetic field extending through the plane of the induction loop arrangement, and
  b) configured to generate a magnetic field through the plane of induction loop means in response to being energised with alternating current electrical power, wherein each solar cell in the solar generating means is substantially transparent to magnetic fields, and wherein the induction generating means is supported in juxtaposition with the rear surface of the solar generating means.

Embodiments of the present invention will now be described, by way of example only, with reference to the accompanying drawings, in which:

DESCRIPTION OF THE EMBODIMENTS

Figure 1:
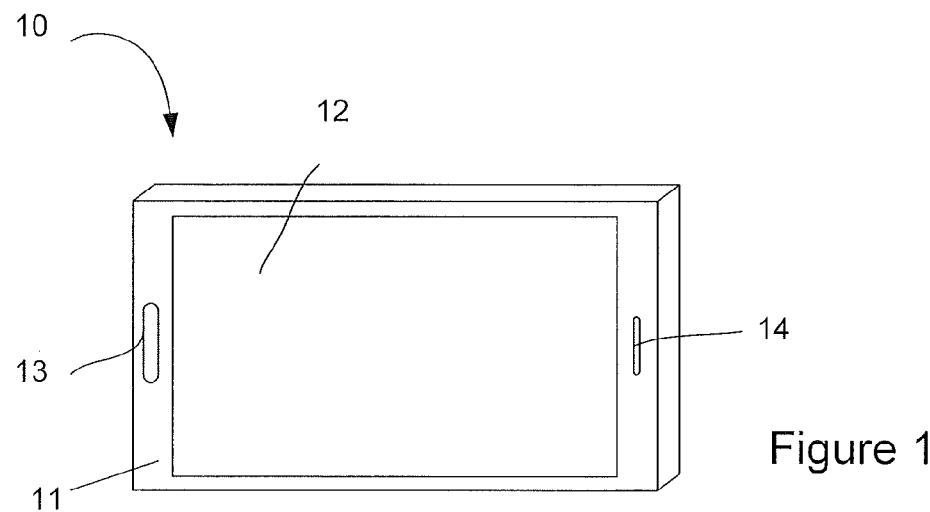
FIG. 1 is a perspective view of primarily a front surface of a device incorporating aspects of the invention.

Referring firstly to FIG. 1, a device 10, which in this example is a mobile telephone or smart phone, is illustrated. The largest face visible in the drawing is the front face of the device 10. The device includes a housing 11, which may take any suitable form. In the front face of the device 10 is a touch screen 12. The touch screen 12 comprises the majority of the area of the front face of the device 10. At one end of the front face of the device 10 is a speaker aperture 13 and at the other end is a microphone aperture 14.

Figure 2:
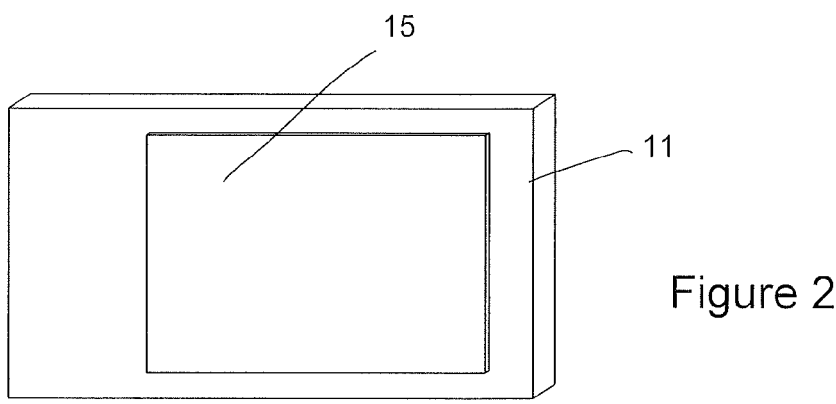
FIG. 2 is a perspective view of primarily a rear surface of the device of FIG. 1.
Figure 3:
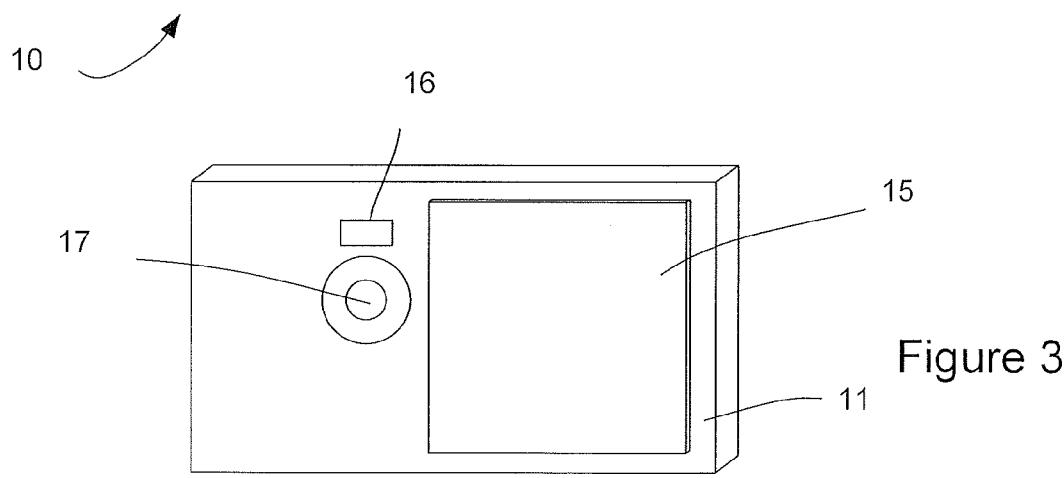
FIG. 3 is a perspective view of primarily the rear of an alternative form of the device of FIG. 1.

Alternative forms for the rear face of the device 10 are shown in FIGS. 2 and 3 respectively.

In FIG. 2, a solar cell arrangement 15 is provided on the rear face of the device 10. The solar cell arrangement 15 occupies more than half of the area of the rear face of the device 10.

In FIG. 3, a solar cell arrangement 15 is a little smaller in size. The solar cell arrangement 15 of FIG. 3 occupies approximately half of the area of the rear face of the device 10. Also on the rear face of the device 10 is a flash 16, for instance an LED flash, and a camera lens 17. A cover (not shown) may be provided for the camera lens 17.

The solar cell arrangement 15 of the FIGS. 2 and 3 arrangements comprise one or more solar cells. The solar cell arrangements 15 are integrated with the housing 11. Alternatively, the solar cell arrangements 15 may be fixedly connected to the housing 11. Alternatively, the solar cell arrangements 15 may be provided as part of a removable rear cover of the housing 11.

Figure 4:
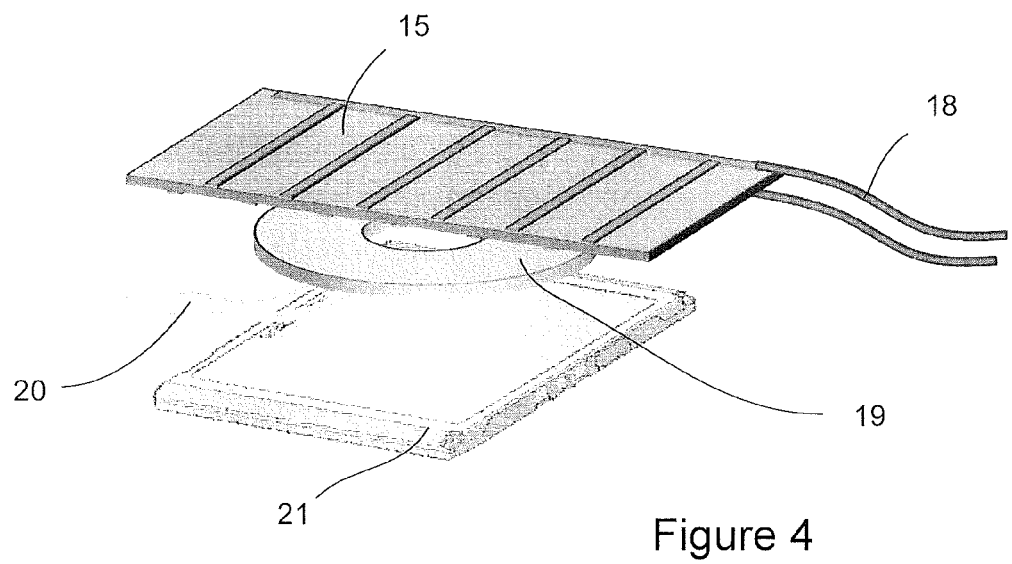
FIG. 4 is a schematic diagram illustrating components of the device of FIGS. 1 to 3.

The solar cell arrangement 15 is shown in FIG. 4. FIG. 4 is a schematic drawing that illustrates some components of the device 10. However, FIG. 4 does not accurately represent the spatial relationship between the components, and in some ways is purely schematic.

The solar cell arrangement 15 includes first and second connecting leads 18. The uppermost surface of the solar cell arrangement 15 shown in FIG. 4 constitutes the part of the solar cell arrangement 15 that is visible in FIGS. 2 and 3.

Beneath the solar cell arrangement 15 is arranged an induction coil arrangement 19. The induction coil arrangement comprise one or more coiled conductors (not visible in the figure). Connectors 20 are connected to the induction coil arrangement 19.

Located beneath the induction coil arrangement 19 is a battery 21. The induction coil arrangement 19 is located between die solar cell arrangement 15 and the battery 21. Although in FIG. 4 the solar cell arrangement 15 is shown as being separated from the induction coil arrangement 19, which in turn is shown as being separated from the battery 21, this is purely schematic. In the device 10, there may be no separation between the solar cell arrangement 15 and the induction coil arrangement 19, or alternatively only a relatively small separation. Similarly, there may be little separation between the induction coil arrangement 19 and the battery 21. If the solar cell arrangement 15 and the induction coil arrangement 19 form part of a rear cover of the device 10, a part of the cover may be present between the induction coil arrangement 19 and the battery 21.

Figure 5:
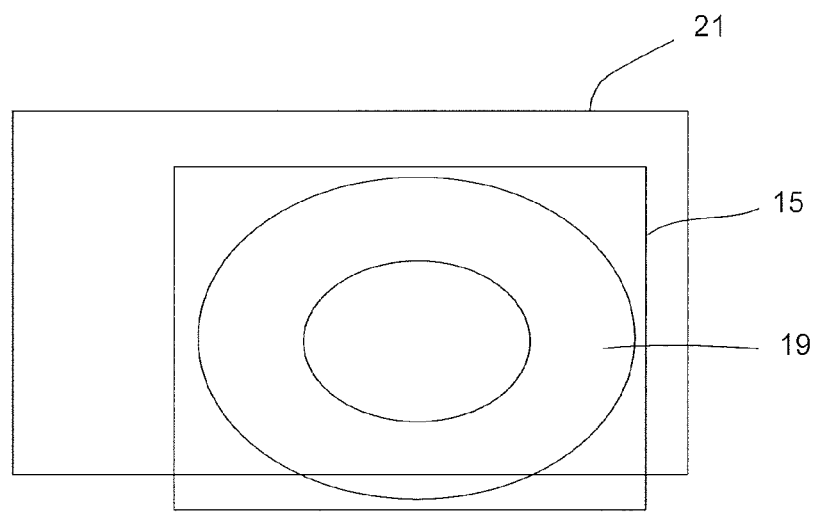
FIG. 5 is a schematic plan view illustrating the arrangement of components shown in FIG. 4.

The relative alignment of the solar cell arrangement 15, the induction coil arrangement 19 and the battery 21 is shown in FIG. 5. Here, it can be seen that a footprint of the solar cell arrangement 15 fully encompasses a footprint of the induction coil arrangement 19. Additionally, a centre point of the footprint of the induction coil arrangement 19 is coincident with a centre point of the footprint of the solar cell arrangement 15. In an alternative arrangement, the footprint of the solar cell arrangement 15 wholly encompasses the footprint of the induction coil arrangement 19 but the centre points thereof are not coincident. In further embodiments, the footprint of the induction coil arrangement 19 is not fully encompassed by the footprint of the solar cell arrangement 15. Instead, at least part of the coil induction 19 protrudes from the edges of the solar cell arrangement 15. In some of these embodiments, central points of the solar cell arrangement 15 and the induction coil 19 are coincident.

The solar cell arrangement 15 may include a single solar cell, or may include plural solar cells connected to one another. Bach solar cell may be polycrystalline, or it may be monocrystalline. The solar cell includes a p doped layer and an n doped layer with plural conductive contacts on the uppermost surface and plural metallic contacts on the rearmost surface thereof. Alternatively, the solar cell arrangement comprises a dye-sensitised solar cell.

In a conventional solar cell, the rear surface is entirely metallised. The metallisation provides an effective electrode, and thereby minimises electron-hole recombination within the cell. However, the solar cell arrangement 15 does not have a fully metallised rear surface. Instead, the rear surface of the solar cell arrangement is provided with a electrode comprised of a transparent conductor. The rear face electrode is substantially transparent to magnetic fields.

For instance, the solar cell arrangement 15 may be a thin film solar cell arrangement and incorporate a thin film conductor on its rear face. The thin film conductor may comprise a thin metallic layer, for instance comprised of aluminium, copper or gold. Because of its relatively small thickness dimension, the thin film conductor is at substantially transparent to magnetic fields. However, because it is comprised of conductive material, it is able to function adequately as an electrode for the solar cell arrangement 15.

For example, the solar cell arrangement 15 may include one ox more heterojunction with intrinsic thin layer (HIT) solar cells, as produced by Sanyo.

The induction coil arrangement 19 comprises one or more electrical conductors, each of which is formed into a coil. The overall form of the induction coil arrangement 19 is of a relatively thin annulus, and can be said to resemble a washer. The induction coil arrangement 19 may take any suitable form. It need not be circular or elliptical in shape, but instead may be square or rectangular. The induction coil arrangement 19 beneficially covers a relatively large area. The induction coil arrangement 19 may have any suitable thickness, although a relatively thin arrangement can be advantageous in portable devices such as mobile telephones, in which designers make efforts to minimise device volume.

The connection of the solar cell arrangement 15 and the induction coil arrangement 19 within the device 10 will now be described with reference to FIG. 6.

Figure 6:
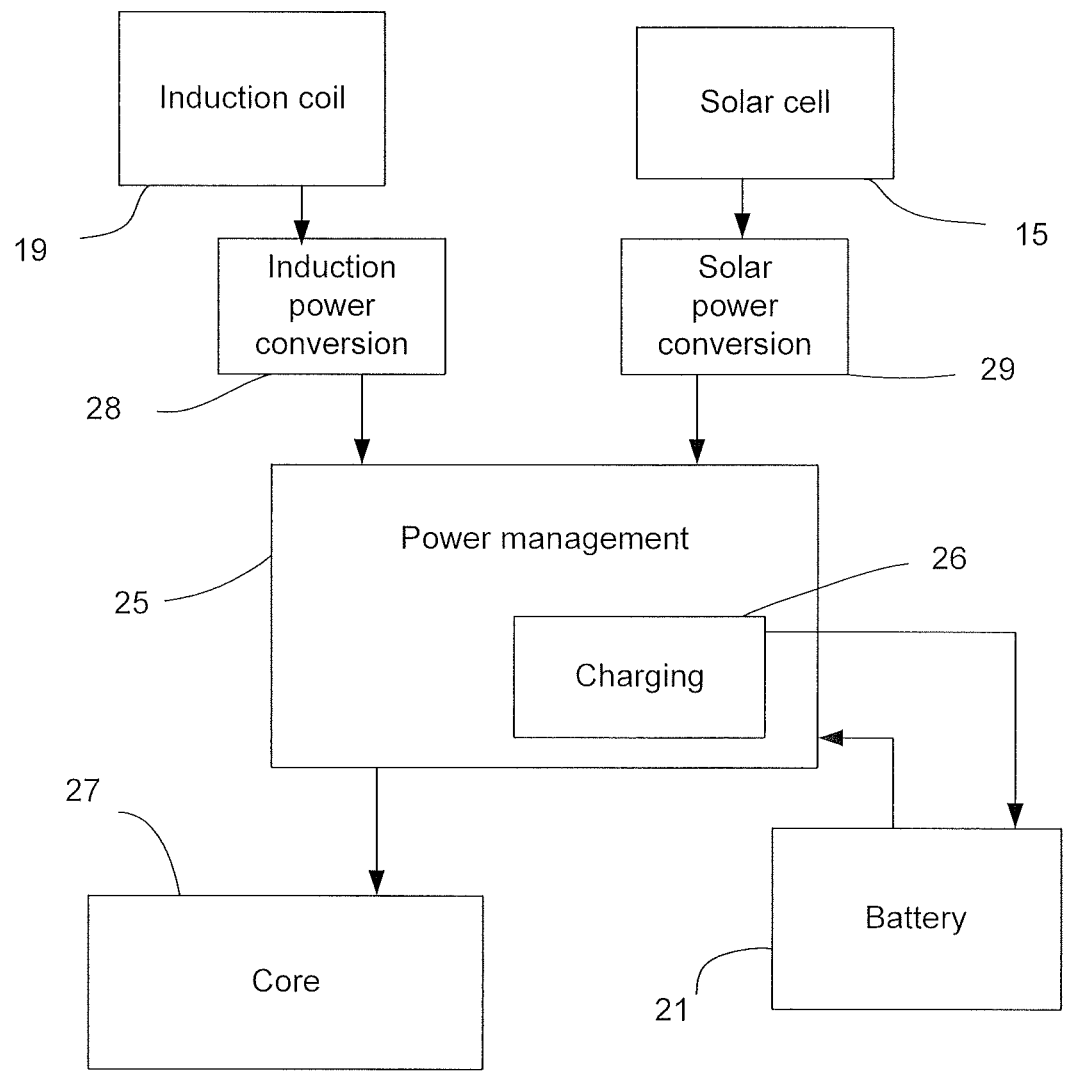
FIG. 6 is a schematic diagram illustrating components of the device of FIGS. 1 to 3.

In FIG. 6, the device 10 is shown to include a power management chip. Included within the power management chip 25 is a charging module 26. The charging module is connected to provide charging power to the battery 21. The power management chip is connected to receive power from the battery 21. The power management chip 25 manages the provision of power to a core 27. Other features of the device 10 are omitted from FIG. 6 for convenience.

The induction coil 19 is shown as being connected to an induction power conversion module 28. The induction power conversion module 28 includes rectification and other circuitry. The induction power conversion module 28 is operable to provide electrical power to the power management chip 25, the electrical power being provided by the influction coil arrangement 19 in the presence of an excitation magnetic field of a suitable frequency.

The power management chip 25 is configured to measure a parameter of electrical power provided by the induction power conversion module 28. Depending on the received power and on power levels required by the core 27 and other components of the device 10, the power management chip 25 can use the electrical power provided by the induction power conversion module 28 to charge the battery 21 through the charging module 26, to power components of the device, such as the core 27, or to power components of the device 10 as well as charging the battery 21.

The solar cell arrangement 15 is connected to a solar power conversion module 29. The solar power module 29 is configured to provide electrical power to the power management chip 25, the electrical power having been generated by the solar cell arrangement 15 in response to the incidence of light upon the uppermost surface of the solar cell arrangement 15. The solar power conversion module 29 may take any suitable form.

The power management chip 25 is configured to measure a parameter of power received from the solar power conversion module 29. The power management chip 25 is configured to use the measured parameter to make a decision as to how to use the provided power. The power management chip 25 may power the core 27 and other components of the device 10, or it may use the charging module 26 to charge the battery 21, or it may perform both of these functions simultaneously.

The device 10 is able to be powered and/or charged by received solar energy or by received magnetic field energy. Moreover, this is achieved without the solar cell arrangement 15 and the induction coil arrangement 19 being provided at different locations on the exterior surface of the housing 11. Because the solar cell arrangement 15 is absent of a metallic substrate, the solar cell arrangement 15 does not block or incident magnetic field energy. Instead, such incident magnetic field energy can excite the induction coil arrangement 19, the effect of which is used by the induction power conversion module 28 to provide electrical power to the power management chip 25.

This can allow greater design flexibility. Additionally, it can allow the use of a solar cell arrangement with a larger area than might be achievable with a corresponding device in which a solar cell and an induction coil were located on different parts of a device housing. Additionally, it can allow the use of a larger, in terms of footprint size, induction coil arrangement. Alternatively, the above-described features may allow a device to have a smaller housing for a given area of solar cell and/or footprint of induction coil arrangement 19.

To utilise solar power, a user typically would place their device face down on a surface, so that the upper surface of the solar cell arrangement 15 is facing the sky. Conversely, to utilise magnetic induction charging, a user typically would place their device with the rear face downwards on top of an induction charging mat or pad. As such, it would not normally be possible for the device 10 to be provided with solar power and magnetic induction power simultaneously. As such, the power management chip 25 can take a simpler form than would be the case if it were required to accommodate magnetic induction power and solar power utilisation simultaneously.

It should be realized that the foregoing embodiments should not be construed as limiting. Other variations and modifications will be apparent to persons skilled in the art upon reading the present specification.

For instance, the device 10 need not be a mobile phone or smart phone, but instead could be a dedicated satellite navigation device, a personal media player or any other portable handheld device. It may instead be a computer, such as a laptop or netbook computer. Also, the device may be provided with hardware keys in addition to or instead of the touch screen 12.

Alternatively, the device 10 may be a charger. In this embodiment, the device 10 includes a rechargeable battery and circuitry configured to charge the battery using electricity generated from incident light or magnetic fields.

The device 10 may be configured so as to allow the battery to be removed and subsequently installed in another device, for powering the another device with solar or magnetic energy without requiring the another device to be provided with the means to generate electricity from such energy.

Alternatively, the device 10 may be provided with a charging circuit. Here, once the battery of the device 10 has been charged, electrical energy in the form of charge may be transferred to a battery of another device by way of the charging circuit. This also allows the another device to be powered with solar or magnetic energy without requiring the another device to be provided with the means to generate electricity from such energy.

In a further alternative embodiment, the device 10 may be provided with an inductive charging circuit that is configured selectively to energise the induction coil arrangement 19 with alternating current electrical energy. Here, once the battery of the device 10 has been charged, electrical energy may be transferred to another device by way of the inductive charging circuit and the induction coil arrangement 19. In this way, the device 10 can provide the functionality of an inductive charging mat or pad. Physically, the device 10 may include a housing with an upper surface at which is presented the upper face of the solar cell arrangement 15. The induction coil arrangement is located in the opposite side of the solar cell arrangement 15 to the upper face. When operating in an induction charging mode, the another device is placed on the uppermost surface of the device 10 so that an induction coil arrangement within the another device couples with a magnetic field generated by the inductive coil arrangement when energised by the alternating current electrical signal. This allows the another device to be powered with solar energy without requiring the another device to be provided with the means to generate electricity from solar energy and without requiring an electrical connection between the device 10 and the another device.

In a still further alternative embodiment, the device 10 is configured to utilise the inductive coil arrangement 19 both to generate electricity from incident magnetic fields and to provide a charging magnetic field, for charging another device. Clearly, the device 10 does not operate in both modes simultaneously.

Moreover, the disclosure of the present specification should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. An apparatus comprising:
    a solar cell arrangement comprising one or more solar cells arranged in a planar structure, the solar cell arrangement having:
        a front surface, and
        a rear surface comprising a thin film conductor rear electrode that is electrically conductive and substantially transparent to magnetic fields,
    the solar cell arrangement being operable to produce electrical power in response to the incidence of light on the front surface; and
    an induction loop arrangement comprising one or more induction loops arranged in a planar structure, the induction loop arrangement being at least one of:
        a) configured to produce electrical power in response to the presence of a magnetic field extending through the plane of the induction loop arrangement, and
        b) configured to generate a magnetic field through the plane of induction loop arrangement in response to being energized with alternating current electrical power,
    wherein the induction loop arrangement is supported beneath the rear surface of the solar cell with a footprint of the one or more induction loops overlapping with a footprint of the solar cell arrangement.

2. The apparatus as claimed in claim 1, wherein a central part of a footprint of the solar cell substantially coincides with a central part of a footprint of the induction loop arrangement.

3. The apparatus as claimed in claim 1, wherein a footprint of the solar cell substantially coincides with a footprint of the induction loop arrangement.

4. The apparatus as claimed in claim 1, wherein a footprint of the induction loop arrangement falls wholly within a footprint of the solar cell.

5. The apparatus as claimed in claim 1, wherein the solar cell arrangement comprises one or more solar cells of the type comprising a heterojunction with an intrinsic thin layer.

6. An apparatus comprising:
    solar generating means comprising one or more solar cells arranged in a planar structure, the solar generating means having a front surface and a rear surface comprising a thin film conductor rear electrode that is electrically conductive and substantially transparent to magnetic fields, the solar generating means being operable to produce electrical power in response to the incidence of light on the front surface; and
    induction loop means comprising one or more induction loops arranged in a planar structure, the induction loop means being at least one of:
        a) configured to produce electrical power in response to the presence of a magnetic field extending through the plane of the induction loop arrangement, and
        b) configured to generate a magnetic field through the plane of the induction loop arrangement in response to being energized with alternating current electrical power,
    wherein the induction loop means is supported beneath the rear surface of the solar generating means with a footprint of the one or more induction loops overlapping with a footprint of the solar generating means.

7. A device comprising:
    a solar cell arrangement comprising one or more solar cells arranged in a planar structure, the solar cell arrangement having a front surface and a rear surface comprising a thin film conductor rear electrode that is electrically conductive and substantially transparent to magnetic fields, the solar cell arrangement being operable to produce electrical power in response to the incidence of light on the front surface; and an induction loop arrangement comprising one or more induction loops arranged in a planar structure, the induction loop arrangement being at least one of:

a) configured to produce electrical power in response to the presence of a magnetic field extending through the plane of the induction loop arrangement, and b) configured to generate a magnetic field through the plane of induction loop arrangement in response to being energized with alternating current electrical power, wherein the induction loop arrangement is supported beneath the rear surface of the solar cell with a footprint of the one or more induction loops overlapping with a footprint of the solar cell arrangement.

8. The device as claimed in claim 7, wherein the device is a mobile communications device.

9. The device as claimed in claim 7, wherein the device includes a rechargeable battery and a charging circuit, for charging another device.

10. The device as claimed in claim 9, wherein the charging circuit is configured to provide alternating current electrical power to the one or more induction loops.

11. The device as claimed in claim 8, wherein the mobile communications device is one of a mobile phone and a smart phone.

* * * * *